UNITED STATES PATENT OFFICE.

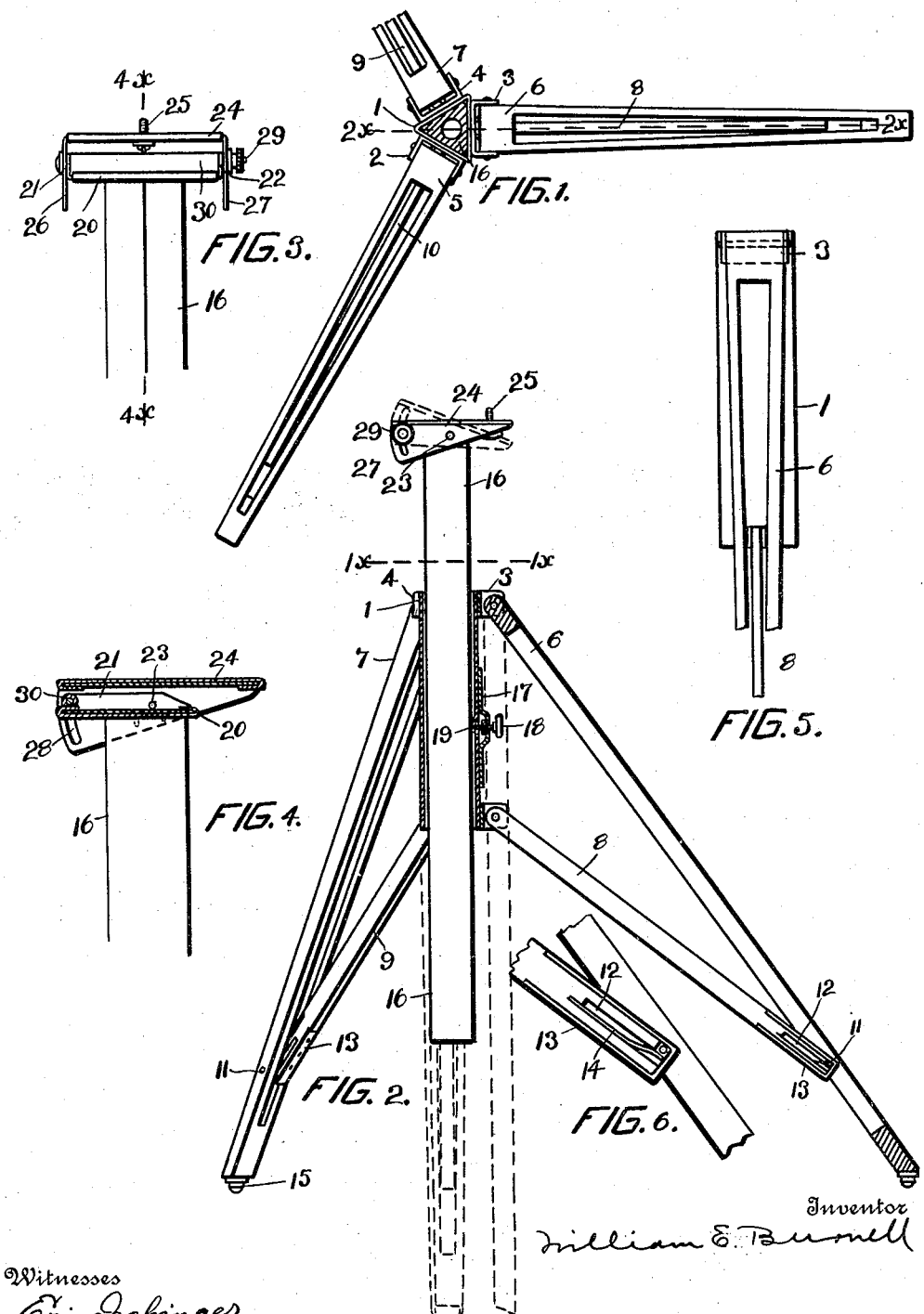

WILLIAM E. BURNELL, OF SILVER SPRINGS, NEW YORK, ASSIGNOR TO GUNDLACH-MANHATTAN OPTICAL COMPANY, OF ROCHESTER, NEW YORK, A CORPORATION OF NEW YORK.

TRIPOD FOR CAMERAS.

1,152,071. Specification of Letters Patent. Patented Aug. 31, 1915.

Application filed December 19, 1913. Serial No. 807,610.

*To all whom it may concern:*

Be it known that I, WILLIAM E. BURNELL, a citizen of the United States, residing at Silver Springs, in the county of Wyoming and State of New York, have invented certain new and useful Improvements in Tripods for Cameras, of which the following is a specification.

The object of this invention is to provide a new and improved tripod for supporting a camera.

Another object of this invention is to improve the stability of the tripod and to provide it with an adjustment for varying the height and inclination of the camera.

These and other objects of the invention will be fully illustrated in the drawings, described in the specification and pointed out in the claims at the end thereof.

In the drawings, Figure 1 is a horizontal sectional view taken on the line 1ˣ—1ˣ of Fig. 2. Fig. 2 is a vertical sectional view taken on the line 2ˣ—2ˣ of Fig. 1. Fig. 3 is an end elevation of the head of the tripod. Fig. 4 is a vertical section on the line 4ˣ—4ˣ of Fig. 3. Fig. 5 is a front elevation of one of the tripod legs and the sleeve to which it is attached. Fig. 6 is a detail view of the locking device for the legs.

In the accompanying drawings, like reference numerals indicate like parts.

In the drawings, reference numeral 1 indicates a sleeve to which are attached the brackets 2, 3 and 4 on which are pivoted the legs 5, 6 and 7. Each of these legs has an opening therein running the length thereof. On the lower end of the sleeve is also provided brackets similar to the brackets 2, 3 and 4 to which are pivotally attached the braces 8, 9 and 10. Each of the legs is provided with a pin 11 near the lower end of the opening. Each of the braces is provided near its lower end with an angular or L-shaped recess 12 formed therein, the lower end of the braces being bound by a strap 13. In this recess is carried a spring 14. One of these braces is provided for each leg and a pin 11 is engaged with the L-shaped recess thereof. The spring 14 is so placed that when the pin 11 is at the bottom or end of the recess, the spring will hold the pin up in the L thereof so that the brace will bear against it endwise, the brace itself being under compression and the leg between the pin 11 and the bracket on which it is pivoted being in tension.

The tripod is folded up by swinging the brace up so that the pin 11 engages and moves in the long slot of the L. The end of each leg of the tripod is provided with the foot 15 which is preferably rounded, it not being necessary to point this foot so as to give it a positive engagement with the floor. It will be understood that in an ordinary tripod, the legs are prevented from spreading by reason of their engagement with the floor while in this tripod the legs are prevented from spreading by the brace rods 8, 9 and 10 and the locking device therefor.

Mounted to slide in the sleeve 1 is a stem 16. On the sleeve 1 is provided a bridge 17 in which is mounted the binding screw 18. Under this binding screw is provided the spring strip 19 which bears against the stem 16 and is forced against it by the screw 18 so as to hold the stem 16 from sliding therein. By means of this arrangement the stem 16 can be adjusted to any height that may be desired within the ring of its length. On top of the stem 16 is provided the plate 20 which is rigidly mounted on said stem. This plate has the flanges 21 and 22 thereon in which is provided the pin 23 on which is mounted to swing the plate 24. This plate carries the clamping screw 25 therein by which the camera may be fastened thereto. This plate is also provided with the flanges 26 and 27 in which are the curved slots 28 through which passes the clamping screw 29, by clamping which the plate 24 may be held in any desired angular position to which it may be adjusted. Between the flanges 26 and 27 is provided the sleeve 30 which holds them in parallel alinement and prevents them from being sprung by the tightening of the screw 29.

I claim:

1. In a tripod the combination of a central support, legs pivotally attached to the top of said support, braces pivotally attached to the bottom of said support, said braces at their lower ends making positive engagement automatically with said legs on the spreading of said legs.

2. In a tripod the combination of a central support, legs pivotally attached at one end of said support, a pin on each of said legs, braces attached to the other end of the support, a recess in each of said braces at the lower end thereof for positively engaging with said pin.

3. In a tripod the combination of a central support, legs pivotally attached at one end of said support, a pin on each of said legs, braces attached to the other end of the support, a recess in each of said braces at the lower end thereof for positively engaging with said pin, a spring on each of said braces for holding said pin in said recess.

4. In a tripod the combination of a central support, legs pivotally mounted at the top of said support, braces pivotally mounted at the bottom of said support, each of said legs having a longitudinal recess therein capable of receiving one of said braces, each of said braces having an L-shaped recess at its lower end, a pin mounted transversely of the longitudinal opening in the leg, said pin being embraced by the brace in said recess.

5. In a tripod the combination of a central support, legs pivotally mounted at the top of said support, braces pivotally mounted at the bottom of said support, each of said legs having a longitudinal recess therein capable of receiving one of said braces, each of said braces having an L-shaped recess at its lower end, a pin mounted transversely of the longitudinal opening in the leg, said pin being embraced by the brace in said recess, a spring in said recess for engaging with the pin and holding it at the end of the recess.

6. In a tripod the combination of a sleeve, legs pivotally attached thereto and braces pivotally attached to said sleeve for holding said legs rigidly in extended position relative to said sleeve and to each other and means for automatically locking said braces to said legs when in extended position.

7. The combination in a folding tripod of rigid legs and rigid braces pivotally mounted therein, and a rigid connection between the converging ends of said legs and the converging ends of said braces by which said legs and braces are pivotally mounted, and means for automatically locking said braces to said legs when in extended position.

In testimony whereof I affix my signature in presence of two witnesses.

WILLIAM E. BURNELL.

Witnesses:
 ERIC ESCHINGER,
 ALICE M. JOHANNS.

Copies of this patent may be obtained for five cents each, by addressing the "Commissioner of Patents, Washington, D. C."